United States Patent Office 2,910,409
Patented Oct. 27, 1959

2,910,409

PRODUCTION OF CITRIC ACID

John H. Fried, White Plains, N.Y., and Joseph G. Sandza, Waldwick, N.J., assignors to Stauffer Chemical Company, a corporation of Delaware No Drawing. Application December 14, 1956
Serial No. 628,243

4 Claims. (Cl. 195—36)

This invention relates to the production of citric acid by the submerged fermentation of a sugar-containing medium. More particularly, the invention relates to a process for the production of citric acid wherein mycelial growth is commenced at a relatively high value of pH, and after a lapse of time, the pH is adjusted to a lower value, by the addition of acid.

Citric acid has been produced for many years by the surface fermentation of sugar-containing materials, such as molasses, utilizing a number of organisms or fungi, which are well-known to those skilled in the art. Heretofore, the main commercial method of producing citric acid has been by surface fermentation which is carried out in shallow pans. Surface fermentation involves a number of disadvantages such as the large area of pans involved, the high labor requirement, and the fact that the fermentation conditions are not uniform throughout the mass.

Although many submerged fermentation methods have been proposed for the production of citris acid, such methods have not been universally accepted since it is difficult to secure the proper type of growth which results in high yields, by submerged fermentation. In surface fermentation, one obtains a pad type of growth. On the other hand, submerged fermentation methods may produce a so-called "mush" or filamentous type of growth, which does not give the desired high yield.

Thus, the previous objection to submerged fermentation was that one obtained a profuse, mush-type of growth, but a poor production of citric acid. The problem is ordinarily less severe with beet molasses than with blackstrap molasses although even when using beet molasses, a considerable amount of the mush-type of growth is obtained.

It is an object of the present invention to provide a simple and effective means of conducting submerged citric acid fermentation under conditions whereby there is obtained the desired pellet type of growth and wherein the conversion of sugar to citric acid is relatively high.

Another object of the invention is to provide a process whereby high yields of citric acid are obtained utilizing ordinary blackstrap molasses.

In general, the object of the present invention is achieved by first inoculating a fermentation medium at a certain pH, allowing the medium to grow for a desired length of time, and then adjusting the pH of the fermentation medium to a lower value, by the addition of acid or acid salts, whereby there is obtained a high yield of citric acid.

It is well-known that citric acid fermentations proceed in two different phases in that first there is a vegetative growth wherein the mycelium multiples quite rapidly, followed by a phase wherein vegetative growth slows down and citric acid production increases. Of course, there is no clear line of demarcation between the two phases since citric acid is produced at all stages and there is vegetative growth at all stages. In accordance with the present invention, each phase is conducted at an optimum value of pH and thus high yields of the desired citric acid are achieved.

In making citric acid from various nutrients, the starting pH may be varied in accordance with the particular starting material. For instance, when using blackstrap molasses, the starting pH will ordinarily be in the range of 4.8 to 5.4, with beet molasses from 5.6 to 6.2, and in invert molasses from 4.3 to 5.0. Generally speaking, the pH is lowered from 0.1 to 1.0 unit and the time of lowering is determined by the growth. Thus, small samples are periodically withdrawn from the medium and centrifuged to determine the mycelial felt volume. When the felt volume has reached from 0.5 to 5.0%, the pH adjustment is made.

Any acid or acid salt may be used for making the adjustment of pH, although sulfuric acid is ordinarily used because of its low cost.

The following working examples illustrate preferred embodiments of the present invention.

Example 1.—The fermentation medium was prepared by using blackstrap molasses as raw material and diluting it with tap water to approximately a 16.7% sugar concentration. The pH was adjusted to 5.1 with $H_2SO_4$, and 10 liters of the medium was poured into a suitable fermentation vessel, made of Pyrex glass and equipped with air sparger and agitator. The vessel with its contents was sterilized in an autoclave for 20 minutes at 15 pounds pressure, cooled, and placed in a 29° C. water bath. Agitation of 450 r.p.m. and sterile aeration of 0.6 volume per minute were started, after addition of 1.4 g./l. of sterile potassium ferrocyanide.

Inoculation was made with a 24 hour growth seed, initiated the previous day on a medium composed of blackstrap molasses diluted with a 16.7% sugar concentration, 0.4 g./l. $NH_4H_2PO_4$, and with the pH adjusted to 4.9. A 40 liter stainless steel tank, equipped with air sparger and agitator and containing 30 liters of the above medium, was sterilized in an autoclave for 30 minutes at 15 pounds pressure, cooled, and allowed to run at 32° C. constant temperature, 240 r.p.m. agitation, and 0.37 c.f.m. aeration. A suspension of $A.$ $niger$ spores (derivative of Wisconsin 72–4), grown in a Roux bottle for 23 days, served as inoculum. After 24 hours, heavy mycelial growth was present. A 6% portion or 600 ml., was removed asceptically and used to inoculate the 10 liter fermentation vessel.

After approximately 22 hours of fermentation, the pH of the medium was found to be 5.0 and the mycelial felt volume, determined by centrifugation, was 1.25%. At this point, the pH was lowered with sterile $H_2SO_4$ to 4.45. Fine spherical units of mycelium, suspended uniformly throughout the medium, developed, and citric acid production increased sharply. After 42 hours from the start, 0.5 g./l. $NH_4NO_3$ was added, since it was found to further enhance conversions.

The fermentation was discontinued after 6⅔ days. Based on the initial amount of sucrose in the medium, a conversion of 51.5% or 86.5 g./l. citric acid was produced. No detectable amount of oxalic acid was observed.

Example 2.—This run demonstrates the effect of omitting the "acid addition technique," as set forth in Example 1. All fermentation conditions were similar to Example 1, including the addition of 1.4 g./l. potassium ferrocyanide. The fermentation was allowed to take its natural course throughout the cycle, and no attempt was made to artificially lower the pH. Within two days, a heavy filamentous growth had formed throughout the medium. Citric production in 5⅔ days was 19.8% or 33 g./l.

Example 3.—The fermentation was conducted, using a stainless steel 100 gallon fermentor equipped with air sparger and agitator.

A quantity of 75 gallons of blackstrap medium, diluted to 16.7% sugar with tap water, was prepared in the 100 gallon tank and the pH adjusted to 5.2+ with $H_2SO_4$. The tank with its content was sterilized, then cooled to 32° C. After 1.4 g./l. potassium ferrocyanide was added asceptically, the medium was inoculated with a 3%, 24 hour growth seed prepared in a 40 liter tank, as in Example 1. Aeration of 6 c.f.m. and agitation of 350 r.p.m. was used throughout the run.

After approximately 22 hours of fermentation, the pH of the medium was found to be 4.65, and the felt volume 1.5% mycelium. At this point, the pH was lowered with sterile $H_2SO_4$ to 4.3+. Other changes, although not necessary, consisted of lowering the temperature to 29° C. and addition of 0.5 g./l. $NH_4NO_3$.

Fine spherical units of mycelium, best described as "pellets," and suspended uniformly throughout the medium developed and persisted. A conversion of 70% citric acid, based on the sugar content or 118 g./l. without oxalic acid was obtained in five days of fermentation.

*Example 4.*—The following are the results taken from 10 liter fermentations in which beet molasses was tested against a control set up identically except no pH adjustment took place during the run. $H_2SO_4$ was utilized in this series of runs.

| Acidification | New pH | Yields | | Type growth |
|---|---|---|---|---|
| | | Percent citric | G./l. citric | |
| Control | -------- | 36.7 | 60.5 | Mushy. |
| 10 ml. conc. $H_2SO_4$ | 4.3+ | 49.6 | 82.0 | Fine pellets. |
| 20 ml. conc. $H_2SO_4$ | 4.1 | 41.6 | 68.6 | Mostly fine pellets. |

A trace of oxalic acid was detected in the control run, none in the other two fermentations. All data are based on a six-day run. The amount of $H_2SO_4$ added as specified was deducted before citric conversions were calculated. Acidification took place at a 2.5% total solid volume. This amounts to approximately 1.5% felt.

Acid addition improved conversions considerably over the control; almost 14% with a pH drop to 4.3+ and about 5% with a pH drop to 4.1.

*Example 5.*—In order to show the use of other acids, a series of 10 liter fermentations was conducted following the general procedure of Example 1. Citric acid and hydrochloric acid were used for acidification. Blackstrap molasses was used as crude sugar source. The data are based on a six-day fermentation. No oxalic acid was detected in any runs. The amount of acid (HCl or citric) added as specified was deducted before citric conversions were calculated.

| Acidification | New pH | Yields | | Type growth |
|---|---|---|---|---|
| | | Percent citric | G./l. citric | |
| Control | -------- | 13.2 | 22.0 | Mushy. |
| 50 ml. HCl | 4.2 | 31.2 | 52.1 | Pellets. |
| 65 g. citric | 4.25 | 41.0 | 68.2 | Do. |
| 25 ml. HCl | 4.5+ | 27.5 | 45.8 | Pellets+mush. |

Instead of adding all the acid at one time, the acid may be added in two or more increments during the fermentation.

We claim:

1. In a process for producing citric acid by submerged fermentation wherein a molasses-containing mash is inoculated with a citric acid producing organism and permitted to ferment, the improvement comprising: adjusting the pH of said mash to between about 4.3 and 6.2; permitting fermentation to proceed until a mycelial felt volume based upon total mash volume of between about 0.5 and 5.0 percent is formed without separation of the components of the mash; adding to said mash so formed sufficient of a compound selected from the group consisting of acids and the acid salts to reduce the pH of said mash at least about 0.1 pH unit to a pH of no less than about 3.3 whereby to induce the formation of fine spherical mycelial pellets and encourage citric acid production; and thereafter permitting further fermentation under the conditions of reduced pH so produced.

2. The process of claim 1 wherein the mash contains blackstrap molasses and the pH thereof is adjusted to between about 4.8 and 5.4 at the outset and said pH reducing compound lowers the pH thereof to no less than about 3.8.

3. The process of claim 1 wherein the mash contains beet molasses and the pH thereof is adjusted to between about 5.6 and 6.2 and the pH reducing compound lowers the pH to no less than about 4.6.

4. The process of claim 1 wherein the mash contains invert molasses and the pH thereof is adjusted to between about 4.3 and 5.0 and the pH reducing compound lowers the pH to no less than about 3.3.

References Cited in the file of this patent

UNITED STATES PATENTS

| | | |
|---|---|---|
| 2,400,143 | Waksman | May 14, 1946 |
| 2,492,667 | Snell et al. | Dec. 27, 1949 |
| 2,674,561 | Moyer | Apr. 6, 1954 |
| 2,739,923 | Martin | Mar. 27, 1956 |

OTHER REFERENCES

Prescott et al.: "Industrial Microbiology," 2nd ed., 1949; publ. by McGraw-Hill Book Co., Inc. (N.Y.); pages 576, 577 and 591 to 594.